United States Patent [19]

Englar et al.

[11] Patent Number: 4,457,480
[45] Date of Patent: * Jul. 3, 1984

[54] MONO-ELEMENT COMBINED SUPERCRITICAL HIGH LIFT AIRFOIL

[75] Inventors: Robert J. Englar, Derwood; Gregory G. Huson, Gaithersburg, both of Md.

[73] Assignee: The United States of America as represented by the Secretary of the Navy, Washington, D.C.

[*] Notice: The portion of the term of this patent subsequent to Jun. 14, 2000 has been disclaimed.

[21] Appl. No.: 444,555

[22] Filed: Nov. 26, 1982

Related U.S. Application Data

[63] Continuation-in-part of Ser. No. 238,265, Feb. 25, 1981, Pat. No. 4,387,869.

[51] Int. Cl.$^3$ .............................................. B64C 21/04
[52] U.S. Cl. ................................. 244/207; 244/35 R; 416/90 A
[58] Field of Search .................... 244/207, 35 R, 12 S, 244/23 D, 110 B; 416/20 R, 90 A; 239/265.23, DIG. 7; 60/231; 114/162, 278; 440/67

[56] References Cited

U.S. PATENT DOCUMENTS

| | | | |
|---|---|---|---|
| 2,868,479 | 11/1959 | Kadosh et al. | 244/207 |
| 3,016,213 | 1/1962 | Griswold | 244/207 |
| 3,172,620 | 3/1965 | Darby | 244/207 |
| 3,367,581 | 2/1968 | Kizilos et al. | 244/207 |
| 3,590,762 | 7/1971 | Yuan | 114/278 |
| 3,669,386 | 6/1972 | Jacobs | 244/207 |
| 3,670,994 | 6/1972 | Kizilos | 244/207 |
| 3,756,540 | 9/1973 | Williams | 244/207 |
| 3,830,450 | 8/1974 | Williams et al. | 244/207 |
| 3,891,163 | 6/1975 | Wilkerson et al. | 244/207 |
| 4,072,282 | 2/1978 | Fulker | 244/35 R |
| 4,137,008 | 1/1979 | Grant | 416/90 A |

OTHER PUBLICATIONS

AIAA-80-1825; Advanced Circulation Control Wing System for Navy STOL Aircraft; J. H. Nichols et al; Aug 4-6, 1980.

Primary Examiner—Galen L. Barefoot
Attorney, Agent, or Firm—R. F. Beers; L. A. Marsh

[57] ABSTRACT

A multi-purpose mono-element airfoil is disclosed for aerodynamic vehicles and devices. The multi-purpose mono-element highlift airfoil when utilized in an aerodynamic application provides a combined no-moving-parts high lift and cruise airfoil which in conjunction with a plenum, upon pressure initiation, causes pressurized air to issue from a slot tanget to the airfoil surface and remains attached to the airfoil's shaped trailing edge, providing a controlled resultant force or thrust. Upon application to hydrodynamic vehicles, the multi-purpose mono-elements airfoil is placed in the freestream and provides turning or pitching forces to the vehicle without any deflection of itself or any mechanical components.

6 Claims, 7 Drawing Figures

CIRCULATION CONTROL WING SECTION AS FLIGHT TESTED ON A-6/CCW AIRCRAFT

TYPICAL NASA SUPERCRITICAL AIRFOIL (17% THICK)

COMBINED SUPERCRITICAL/CCW HIGH LIFT AIRFOIL

MONO-ELEMENT COMBINED SUPERCRITICAL HIGH LIFT AIRFOIL

This application is a continuation-in-part of application Ser. No. 238,265 filed Feb. 25, 1981 now U.S. Pat. No. 4,387,869.

BACKGROUND OF THE INVENTION

1. Field of the Invention

This invention relates to and provides for a mono-element combined supercritical high lift airfoil comprising a mechanically simple but effective blown high lift system compatible with and enclosed within the physical contours of the general family of transonic cruise wing sections known as supercritical airfoils. Heretofore, in order to generate high lift, such airfoils have been combined with conventional mechanical flap systems which incur high weight penalties. The high lift airfoil of the present invention requires no movement or deflection of any mechanical components within or on the airfoil, and transitions from the cruise mode to the high lift mode merely by initiating blowing from within the airfoil. The airfoil of this invention augments and enhances each component in its specific region of operation, thus providing a simple non-mechanical mono-element airfoil with uncompromised performance in the cruise, takeoff, and landing flight regimes. Upon application to hydrodynamic vehicles, the no-moving-parts trailing edge is applied to a fin or control surface and provides turning or pitching forces to the vehicle without any deflection of itself, thus replacing mechanical rudders, elevators or vanes.

2. Description of the Prior Art

Existing mechanical high lift systems or devices are used to provide an effective increased camber to the airfoil, thus providing increased streamline deflection, increased circulation, and resulting higher lift. Most state-of-the-art systems provide some type of mechanical deflection of a trailing edge flap, with those producing the greatest lift usually requiring multiple flap components, actuators, connectors, tracks, and structural mounting components. Such systems or devices greatly increase complexity and weight, as well as, increase maintenance requirements. More recently, blowing over these flap surfaces has added increased lift capability; however, complexity and weight are increased further. The recently developed circulation control wing (CCW) system increases lifting capability by blowing over a round trailing edge, but this device must be retracted to avoid the drag penalty in cruise.

Existing hydrodynamic control surfaces, such as, fins, rudders, stabilizers, elevators, etc., are used to provide an effective control of the vehicle. Such control surfaces and their actuators are also complex, and increase weight and maintenance requirements.

SUMMARY OF THE INVENTION

The present invention relates to a multi-purpose mono-element airfoil means for use in aerodynamic and hydrodynamic vehicles and devices. Upon utilization in an aerodynamic application, the multi-purpose mono-element airfoil means in conjunction with a plenum, upon pressure initiation, causes pressurized air to issue from a tangential slot remain attached to the shaped trailing edge and provides a controlled resultant force or thrust. Upon application to hydrodynamic vehicles, the multi-purpose mono-element airfoil means is placed in the fluid stream and provides turning or pitching forces to the vehicle without any deflection of itself.

Accordingly, an object of this invention is to provide a multi-purpose mono-element airfoil means for use in aerodynamic and hydrodynamic vehicles and devices.

Another object of this invention is to provide a multi-purpose mono-element airfoil means wherein the included high lift components are located within a supercritical airfoil means such that the combined system provides and controls entrained air flow that yields additional lift augmentation, drag reduction and high cruise performance at subsonic and transonic speeds, without any physical or mechanical change in the airfoil profile or shape. Furthermore, the favorable characteristics of both cruise and high lift airfoils are not compromised.

A further object of this invention is to provide similar advantages when it is used in a hydrodynamic application where control forces are provided and the need for deflecting surfaces and trailing edges and their actuators is eliminated.

DESCRIPTION OF THE PREFERRED EMBODIMENT

Figure 1:
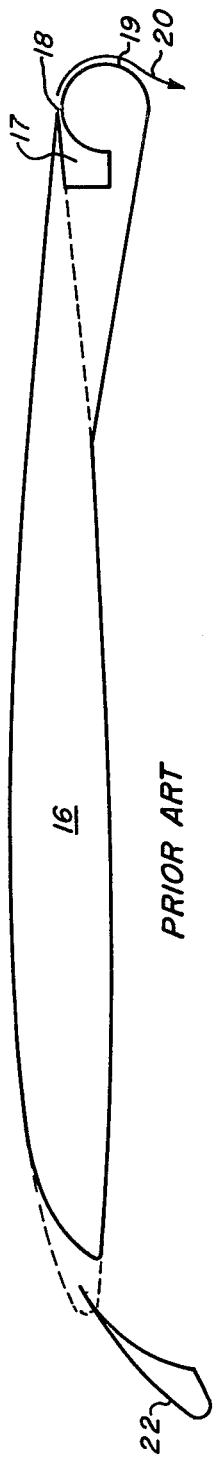
FIG. 1 shows a state-of-the-art circulation control wing high lift system as tested on A-6/CCW aircraft (thin profile with large round trailing edge)
Figure 2:
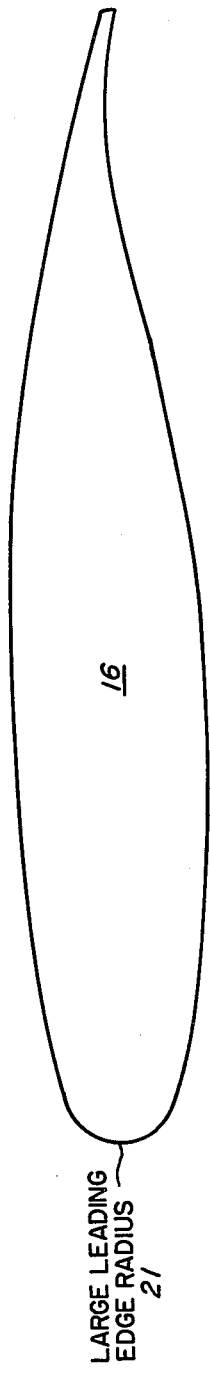
FIG. 2 shows a 17% thick NASA supercritical airfoil having a typical aft camber, bluff trailing edge thickness, and large leading edge radius.
Figure 3:
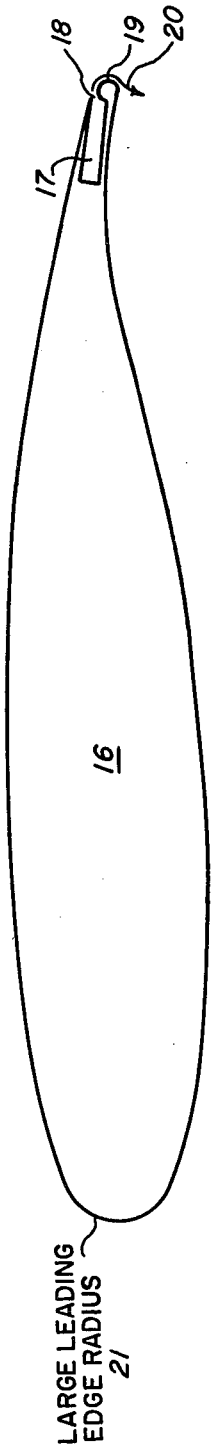
FIG. 3 shows the favorable characteristics of the present invention wherein the supercritical and CCW airfoils are synergistically combined to utilize the advantages of each.

FIG. 1 shows a state-of-the-art circulation control wing (CCW) configuration, the high lift operation of which has been confirmed by flight test. The aircraft wing 16 has mounted within its trailing edge an air supply plenum 17 which replaces the previously used mechanical flap at the wing trailing edge, along with shaped trailing edge 19 and slot 18 from which issues a circulation control (CC) jet sheet 20 produced by pressurized air from plenum 17. The present invention is shown in FIG. 3 where the thick aft section of the supercritical airfoil 16, originally designed as shown in FIG. 2 to control shock-induced flow separation at transonic speeds, is ideally suited to incorporate the small CCW shaped trailing edge radius 19. Supercritical airfoils typically use trailing edges having a height of 2% of the chord length as shown in U.S. Pat. No. 4,072,282, FIG. 9. Further, said thickness ahead of shaped trailing edge 19 allows installation of plenum 17 to carry bleed air from the aircraft thrust engine or auxiliary power unit to blowing slot 18. The combined airfoil's performance is not compromised by the high lift system, and the high lift system does not have to be mechanically retracted for cruise flight.

A test wherein the trailing edge radius 19 size is about twenty-five percent the size of that previously flight tested, i.e. 0.9% chord versus 3.6% chord, shows substantially no lift loss relative to that generated by the larger radius; and further, lift generation by the small radius is two to three times greater than that achievable by the best multi-element mechanical flap system. This very efficient lift generation is achieved by blowing a thin sheet of pressurized air form a small slot 18 tangentially over a shaped trailing edge 19 as shown in FIG. 3. Jet sheet 20 remains attached to shaped trailing edge 19 and induces large flow circulation and resulting high lift on airfoil 16, all at a relatively low jet blowing rate. Moreover, this test utilizing small trailing edge radius demonstrated no increase in blowing-off drag levels above those of the bluff trailing edge configuration shown in FIG. 2. And, even though the shaped trailing edge 19 (i.e., total trailing edge thickness) is approximately twice the thickness of the supercritical trailing edge of FIG. 2, the flow remains attached around part of the shaped curvature without blowing so that the base drag generated is the same as that of the sharp-cornered flat trailing edge as shown in FIG. 2. Thus, in operation, the high lift system is non-moving and self-contained, produces no cruise drag penalty, is readily available by initiating blowing and generates at least double or triple the lift of the very complex mechanical multi-element flaps.

The blowing slot 18 located at the shaped trailing edge 19 further augments the supercritical airfoil's 16 transonic performance. A slight amount of blowing at transonic speeds entrains flow into the jet sheet 20 and prevents aft flow separation, thus reducing transonic cruise drag. Transonic maneuverability is also enhanced, as initiation of blowing provides instantaneous lift increase and the resulting change in flight path.

The large leading edge radius 21 of supercritical airfoil 16 of this invention, originally designed to provide smooth convergence into the virtually flat upper surface, aids the high lift performance by becoming an effective leading edge device. Under high lift conditions, CCW airfoils require means for keeping leading edge flow attached. A leading edge slat 22 illustrated in FIG. 1, or droop is frequently used for sharp leading edge airfoils. However, the existence of a large bluff leading edge, as illustrated in FIGS. 2 and 3, avoids this problem as it naturally keeps leading edge velocities lower and prevents flow separation. Thus, the leading edge shape of the supercritical airfoil 16 eliminates the need for a leading edge device 22 on the high lift airfoil of this invention.

Figure 4:
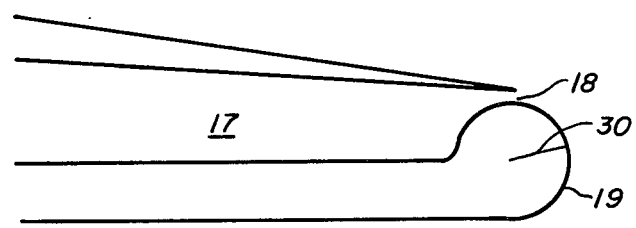
FIG. 4 shows in detail the shape of the trailing edge according to a first embodiment of the invention.

The shape of the trailing edge may be varied somewhat, as long as the edge fits within the overall shape of the supercritical airfoil and as long as the curve is not too sharp for the jet sheet to stay attached. A first embodiment of the trailing edge shape is shown in FIG. 4, where the trailing edge assumes the shape of a circle having a constant radius, indicated by line 30. The radius must be no larger than 1% of the chord length in order to fit within the airfoil shape. At the lower side of the circle where the circle intercepts the supercritical airfoil shape, the circle shape is dropped and the airfoil shape is followed to avoid changing the flight characteristics of the supercritical airfoil.

Figure 5:
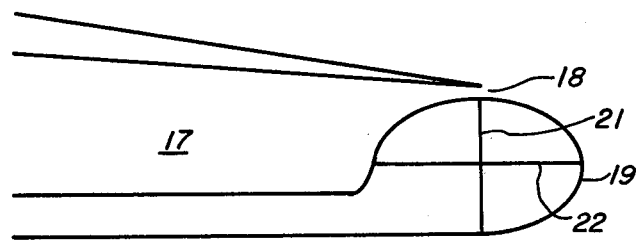
FIG. 5 shows in detail the shape of the trailing edge, according to a second embodiment of the invention.

In FIG. 5, a second embodiment of the trailing edge shape is shown as constituting an elliptical shape. The major axis 22 of the ellipse is essentially parallel to the axis of the airfoil with minor axis 21 being perpendicular thereto. The elliptical shape is no longer followed where it intersects the supercritical shape, just as in FIG. 4. The length of the minor axis is limited to 2% of the chord length in a manner analogous to the circular shape. The relative sizes of the major and minor axes are limited by the sharpness of the curve. Thus, if ellipse becomes too long and narrow, the jet sheet will not follow the curve. When the two axes become equal, the circular situation is reached. It is also possible to have the major axis extend in the vertical direction as long as the difference in the axes is not too great. In addition, it is also possible to move the major axis so that it is not parallel to the axis of the airfoil.

Figure 6:
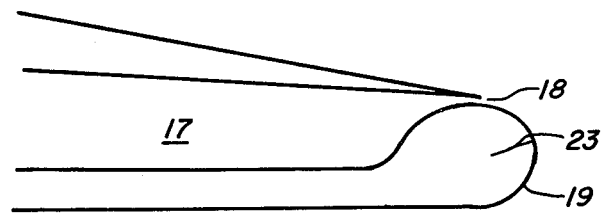
FIG. 6 shows in detail the shape of the trailing edge according to a third embodiment of the invention.

A third embodiment is shown in FIG. 6 utilizing a spiral shape. This is similar to the circular shape, but with a radius 23 that becomes smaller as it rotates around the trailing edge. Because of the reducing radius, the curve becomes sharper than a regular circle. This also limits the rate of decrease of the radius, since the jet sheet will not stay attached if the curve is too sharp. As in the other two embodiments, the spiral curve ends when it intersects the supercritical shape. Other spiral shapes may also be used, such as a spiral with a radius which decreases at a non-linear rate, an increasing radius or more complex spirals.

In all three embodiments, the curve shape is shown as extending inside the plenum 17. However, the curve may also be somewhat modified or truncated when it is inside the plenum. For example, since the spiral radius increases inside the plenum, it may be more convenient to use a constant circular radius for this portion for ease in construction.

Other curves may also be employed for this purpose, such as partially round shapes. The only limitations are that the curve fits within the wing and that the curve is not too sharp.

In operation, only a fast-responding flow valve or regulator is required to control air flow to power the high lift system. The valve may be mounted inside the aircraft fuselage or in the wings. With the valve closed in cruise, airfoil 16 possesses the favorable transonic characteristics of the supercritical airfoil. For takeoff or landing where high lift requirements are functions of gross weight and speeds and distance desired, the valve is opened proportionally to yield the value of lift required. The small CCW device of this invention allows that value to be twice or three times that available from mechanical systems, without any moving parts. Thus, the resulting takeoff and landing speeds and distances are proportionally reduced. The flow valve may also be opened a small amount in cruise flight to reduce base drag, or a slightly larger amount to provide instantaneous lift for maneuverability.

The slot size may also be made adjustable so as to vary the flow of air through the slot. This may be accomplished by hinging part of the top portion of the wing and using a jack screw, hydraulic ram or other device to raise up the top portion of the wing. An example of this type of apparatus is shown in U.S. Pat. No. 4,137,008.

Figure 7:
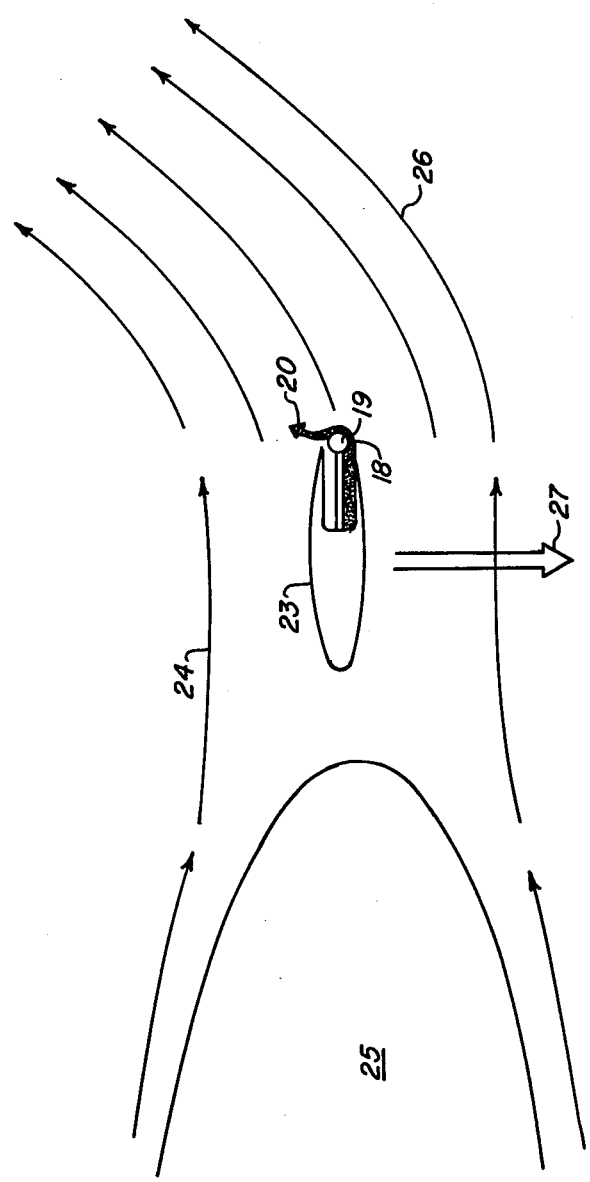
FIG. 7 shows a hydrodynamic control surface or force generator containing no moving parts.

FIG. 7 illustrates a hydrodynamic application of a non-deflecting small shaped trailing edge 19 in conjunction with dual plenums and slots 18 of a control surface 23 placed in a fluid freestream 24 behind a hydrodynamic vehicle 25. The freestream 24 is then deflected in either direction 26 depending on which of the plenums 18 is pressurized, thus producing a controlling force 27 or moment in the appropriate direction. The small trailing edge 19 fits within the existing control surface 23 countour and requires no mechanical deflection. Advantages are similar to the ones from use in the aerodynamic application, namely, rapid deflection of control forces, augmentation of control force, and system simplicity through elimination of moving parts.

This invention, for the first time, yields an advantage not heretofore attainable, namely, the synergistic and mechanically simple combination of a supercritical transonic airfoil and a high lift CCW airfoil into a single, no-moving-parts airfoil which maintains the favorable characteristics of each type of airfoil in its design operating regime yet does not compromise either airfoil's operation by the presence of the other. A further important advantage is its ability to transition from one mode of operation to the other without the use of any mechanical parts. Such unique features of this combination yield other advantages in its savings of special airfoil materials and energy used heretofore. Other advantages will be apparent from the specification described above to those skilled in the art.

Obviously, many modifications and variations of the present invention are possible in light of the above teachings. It is therefore to be understood that within the scope of the appended claims the invention may be practiced in ways other than as specifically described above.

What is claimed is:

1. A mono-element airfoil for providing high lift generation, drag reduction and high cruise performance at subsonic and transonic speeds, comprising:
   a supercritical airfoil means having a large leading edge radius and a relatively blunt trailing edge, said trailing edge having a thickness of about 2% of the chord length of said airfoil means;
   a plenum inside said wing having an inlet connected to a source of gas pressure and an outlet in the trailing edge of said airfoil means;
   said outlet being formed as a slot means between an upper portion and a lower portion;
   said upper portion being a part of the upper surface of said wing and having a reduced thickness near the rear edge;
   said lower portion forming the rear wall of said plenum, the lower edge of said slot and the trailing edge of said airfoil means, said lower portion being elliptical in cross-section and having a minor axis no greater than 2% of the chord length of said airfoil means;
   said slot means having a smoothly converging nozzle with the portion of said nozzle having the minimum height being at the rear edge of said upper portion;
   said outlet forming a circulation control device wherein gas from said source of gas pressure is controlled to travel through said plenum, escape through said converging nozzle and slot means and travel along the trailing edge of said airfoil to deflect the air traveling over the top surface of said airfoil means downwardly, so that high lift on the airfoil is caused by this deflected large flow of air which remains strongly attached to said trailing edge with a relatively low jet blowing rate through said slot means while low cruise drag is encountered when blowing is stopped.

2. The airfoil according to claim 1 further comprising an internal valve to control the flow rate through said slot means and thus control the deflection of the airstream.

3. The airfoil according to claim 2 wherein said plenum is located near the trailing edge of said airfoil means.

4. A mono-element airfoil for providing high lift generation, drag reduction and high cruise performance at subsonic and transonic speeds, comprising:
   a supercritical airfoil means having a large leading edge radius and a relatively blunt trailing edge, said trailing edge having a thickness of about 2% of the chord length of said airfoil means;
   a plenum inside said wing having an inlet connected to a source of gas pressure and an outlet in the trailing edge of said airfoil means;
   said outlet being formed as a slot means between an upper portion and a lower portion;
   said upper portion being a part of the upper surface of said wing and having a reduced thickness near the rear edge;
   said lower portion forming the rear wall of said plenum, the lower edge of said slot and the trailing edge of said airfoil means said lower portion being spiral in cross-section and having a vertical height no greater than 2% of the chord length of said airfoil means;
   said slot means having a smoothly converging nozzle with the portion of said nozzle having the minimum height being at the rear edge of said upper portion;
   said outlet forming a circulation control device wherein gas from said source of gas pressure is controlled to travel through said plenum, escape through said converging nozzle and slot means and travel along the trailing edge of said airfoil to deflect the air traveling over the top surface of said airfoil means downwardly, so that high lift on the airfoil is caused by this deflected large flow of air which remains strongly attached to said trailing edge with a relatively low jet blowing rate through said slot means while low cruise drag is encountered when blowing is stopped.

5. The airfoil according to claim 4 further comprising an internal valve to control the flow rate through said slot means and thus control the deflection of the airstream.

6. The airfoil according to claim 5 wherein said plenum is located near the trailing edge of said airfoil means.

* * * * *